April 30, 1963     W. R. EDDY ETAL     3,087,645
METHOD FOR FORMING LINERS FOR VESSELS
Filed Nov. 14, 1958
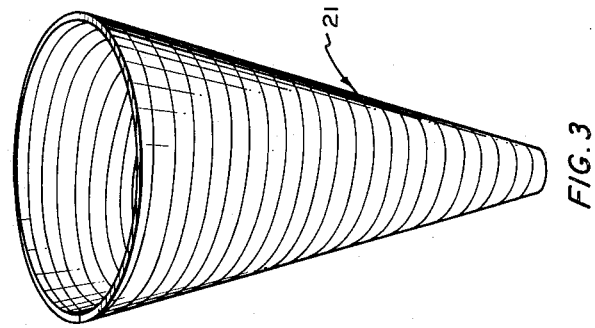
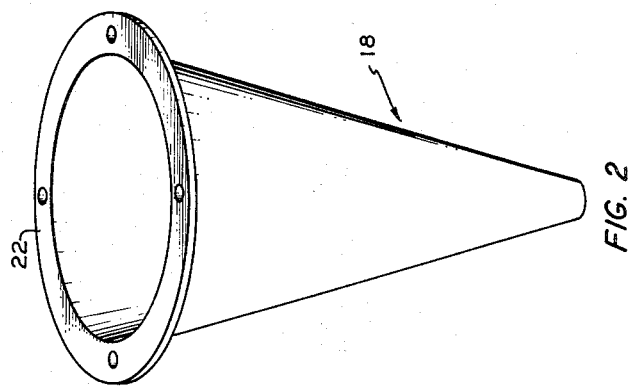
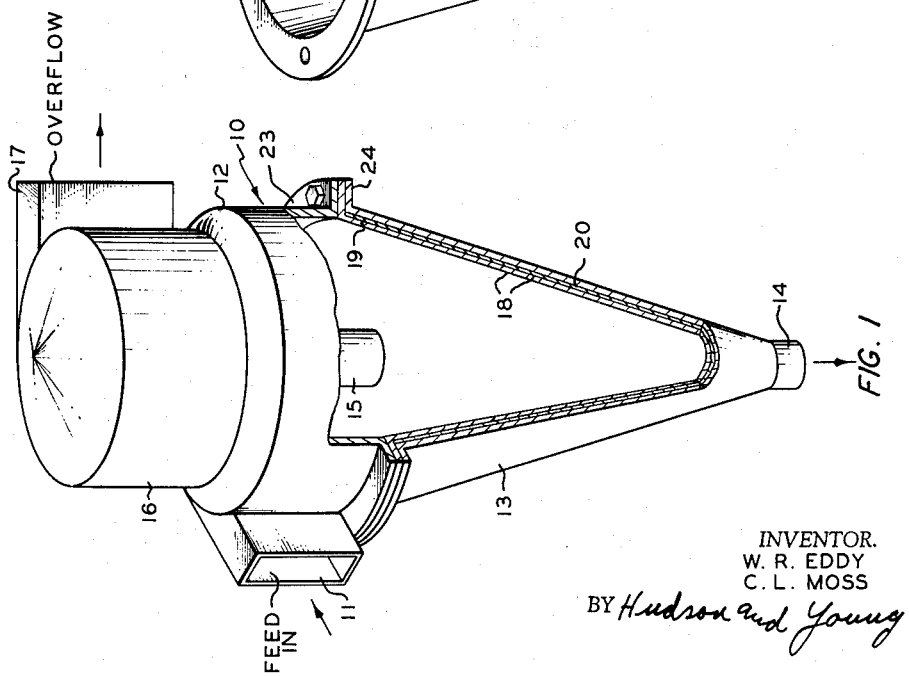
INVENTOR.
W. R. EDDY
C. L. MOSS
BY Hudson and Young
ATTORNEYS United States Patent Office 3,087,645
Patented Apr. 30, 1963

3,087,645
METHOD FOR FORMING LINERS
FOR VESSELS
William R. Eddy, Idaho Falls, Idaho, and Coy L. Moss, Albuquerque, N. Mex., assignors to Phillips Petroleum Company, a corporation of Delaware
Filed Nov. 14, 1958, Ser. No. 774,042
10 Claims. (Cl. 220—63)

This invention relates to liners for vessels so as to render same resistant to abrasion or erosion. In one aspect, this invention relates to an improved method for forming a lining for the interior of a vessel by constructing the lining on a support exterior of the vessel and inserting the support and liner in the vessel. In one of its more specific aspects, this invention relates to the preparation of a lining material for the conical section of a cyclone separator.

Various vessels used in industry, particularly in the field of chemical engineering, have their inner walls subjected to erosion or abrasion and as a result these vessels often require a lining material which is resistant to the particular type of attack to which they are subjected. Various methods have been proposed for preparing such lining materials and in some instances the application of a liner to the interior of the vessel presents no serious problem. However, the application of lining material such as tungsten carbide to the interior of a small and irregularly-shaped vessel poses a problem which is not solved by the methods proposed by the prior art. Various materials such as tungsten carbide, alumina, and other rigid, inflexible materials are particularly resistant to abrasion and provide superior protection to the inner walls of the vessels subjected to the abrasive action of particles in motion; however, present methods of applying these materials to a surface do not lend themselves to the application of the materials to the interior wall of small and irregularly-shaped vessels.

The principal object of this invention is the provision of a liner for the interior of vessels and a method for the fabrication of such liner. It is also an object of this invention to provide a method for lining the conical section of a cyclone separator with a thin lining of tungsten carbide, alumina, or other abrasion-resistant material. Other objects and advantages of this invention will be apparent to those skilled in the art upon study of this disclosure including the drawing wherein:

FIGURE 1 is a view in partial section of a vessel lined in accordance with the invention;

FIGURE 2 is a view of a liner for a vessel prepared in accordance with the invention; and FIGURE 3 is a view of a liner for a vessel prepared according to a modification of the invention.

The method of the invention involves applying a thin coating of abrasion-resistant material to a thin supporting member of relatively soft and flexible metal which conforms to the interior of the vessel or can be shaped to conform to the interior of the vessel after which the coated liner is secured within the vessel by spot welding or other means. In a preferred embodiment of the invention, a liner structure is fabricated of soft metal which serves as a mandrel for the application thereto of a thin coating of the abrasion-resistant material. The coated liner can be inserted in the vessel and securely positioned there so that abrasion will wear away the softer mandrel of metal and leave the liner of abrasion-resistant material as a protective layer adjacent the vessel wall. Although metal is the preferred material for fabrication of the supporting shell, other materials can also be used. Thus the coating can be applied to glass and other materials which will stand a temperature of about 400° F. We have found that a thin coating of a rigid, relatively inflexible material such as tungsten carbide or alumina can be applied to a thin strip of a soft metal such as brass or iron and the strip can be flexed sufficiently so as to be formed into a desired shape without the coating cracking or the bond between the coating and the strip failing. This is surprising in view of the extreme brittle nature of most materials used for their abrasion-resistant properties. Thus an embodiment of the invention comprises coating a strip of thin, flexible metal, e.g., brass or iron shim stock, with an abrasion-resistant material such as tungsten carbide or alumina and applying, as a spiral, to conform to the inner surface of the vessel with the coating on the inner surface of the resultant liner.

A description of the invention will be facilitated by reference to the drawing wherein FIGURE 1 illustrates a cyclone separator 10 wherein the feed enters through conduit 11 into the feed chamber 12 in such manner that the flow is directed around the periphery of the feed chamber 12 and descends into the cone chamber 13. A cyclone separator is often used to separate solids from a liquid-solid slurry and in such case the slurry is fed into the upper part of the cyclone under pressure. The feed enters tangentially by means of conduit 11 at high velocity and the centrifugal forces produced cause the heavier and larger particles to move toward the wall. They then move downward through cone 13 to the apex thereof and out the underflow orifice 14 as a thickened slurry. The particles of less mass do not have as much tendency to settle to the wall and are forced upward to, and through, the overflow orifice 15 into the overflow chamber 16 and thence out through conduit 17. The feed chamber 12 and the overflow chamber 16 are separated by a head plate (not shown) and access from the chamber 12 to overflow chamber 16 is by means of the overflow orifice 15.

Replaceable liner 18 for cyclone 10 comprises a thin shell 19 of erodible material which has a coating 20 of abrasion-resistant material applied thereto.

The liner 18 can be positioned in the cone section 13 of the cyclone 10 by spot welding or can be fitted therein friction tight. A preferred method for securing the liner is by means of lip 22 on the liner which is secured between the flange members 23 and 24 of cyclone 10.

The lining 18 is prepared by fabricating a cone shell 19 of a base material slightly under-size if a close fit is required. Ordinarily it is desirable that the liner fit snugly so as to avoid subjecting the thin liner to mechanical stresses since the liner is extremely thin. The thickness of the coating will vary from 0.002 to 0.01 inch in thickness depending upon the method of applying the coating and the number of steps employed in applying the coating.

The cone 19 can be coated with abrasion-resistant material by known methods including those referred to as metalizing, flame plating (a method of applying thin coatings of tungsten carbide and aluminum oxide described in the Linde Flame Plating Bulletin of August 2, 1957, published by Union Carbide Corporation), hard facing with a gas torch, and hard facing by the electric arc method. The application of erosion-resisting or abrasion-resisting compositions to metal surface by the above methods is accomplished by applying the abrasion-resistant material in finely divided or powdered form together with a binder comprising a lower melting metal so that the melted metal attaches to the base metal to be coated and secures thereto the harder particles of abrasion-resistant materials.

In the flame coating process a flammable gaseous mixture of fuel and oxidizer, containing a suspension of powdered abrasion-resistant material, is detonated and the powdered material, together with a binder, is discharged onto the surface to be coated.

When the welding technique is employed in applying the coating, the welding rod comprises a metal tube containing therein the powdered abrasion-resistant material and the metal tube is melted and flowed onto the surface to be coated, carrying therewith the powdered material.

When the metalizing technique is employed, the wire which is fed to the metalizing gun is hollow and contains therein the powdered abrasion-resisting material.

The coating is applied in a strip about 3/4 inch to 1 inch wide by the above-described processes and the shell 19 is advantageously mounted upon a rotatable jig and a coating is applied in spiral form as the shell 19 is rotated. Constant rotation of the shell during the application of the coating will tend to offset any tendency for the shell to warp out of shape as a result of the heat applied thereto.

After installation of the coated shell, and as a result of operation, the shell itself will be eroded away leaving the lining of abrasion-resistant material and this lining will present a smooth surface as a result of the bond to the smooth surface of the metal shell.

In the modification shown in FIGURE 3 a thin strip of metal such as shim stock is coated with abrasion-resistant material and the cone 21 is formed to conform to the inside of the cone 13 of cyclone 10 with the abrasion-resistant material on the inner surface thereof. The liner can be formed by applying the strip of material to the inner surface of the cone 13 and securing the resulting liner thereto or the cone 21 can be preformed and inserted in cyclone cone 13 and secured thereto by spot welding or other conventional means. A lip such as lip 22 of FIGURE 2 can be secured to cone 21 to facilitate securing the cone 21 in the cyclone 10.

Although the invention has been described with particular reference to a cyclone separator, it will be appreciated by those skilled in the art that the disclosed method of fabricating a liner will be applicable to other vessels.

Tungsten carbide and alumina have been disclosed as specific abrasion-resistant materials; however, it is to be understood that other abrasion-resistant materials can be employed. The principal requirement for the abrasion-resistant material is that it be harder than the material which is causing the abrasion to the vessel to be lined.

Reasonable variations and modifications are possible within the scope of the present disclosure without departing from the spirit and scope of the invention.

That which is claimed is:

1. An abrasion-resistant liner for a vessel conforming to the interior surface of said vessel comprising a shell of erodible material and having thereon a coating of rigid, relatively inflexible abrasion-resistant material.

2. The liner of claim 1 wherein the shell of erodible material is a continuous strip of flexible metal and the abrasion-resistant material is on the interior surface of said shell.

3. The liner of claim 1 wherein said shell comprises an erodible metal liner and the abrasion-resistant material is on the exterior surface of said shell.

4. An improved method for fabricating an abrasion-resistant liner for a vessel which comprises applying a thin coating of a rigid, relatively inflexible abrasion-resistant material to an erodible support adapted to conform to the interior surface of said vessel.

5. An improved method for fabricating an abrasion-resistant liner for a vessel, the interior of which is too small for the direct application of the abrasion-resistant material, which comprises applying a thin coating of rigid, relatively inflexible abrasion-resistant material to a strip of shim stock metal; applying the coated strip to the inner surface of said vessel so as to conform substantially to the contour of the inner surface of said vessel; and securing said strip in said vessel with the coated side of said strip as the exposed liner for said vessel.

6. An improved method for fabricating an abrasion-resistant liner for a vessel which comprises forming a shell of erodible material conforming substantially to the interior of the vessel; coating the exterior of said shell with a coating of rigid, relatively inflexible abrasion-resistant material; and securing the coated shell in the vessel.

7. An improved method for fabricating an abrasion-resistant liner for a vessel which comprises applying a thin coating of tungsten carbide to an erodible support adapted to conform to the interior surface of said vessel.

8. An improved method for fabricating an abrasion-resistant liner for a vessel which comprises applying a thin coating of alumina to an erodible support adapted to conform to the interior surface of said vessel.

9. An abrasion-resistant liner for a vessel comprising a shell of erodible material conforming to the interior surface of said vessel and having thereon a coating of tungsten carbide.

10. An abrasion-resistant liner for a vessel comprising a shell of erodible material conforming to the interior surface of said vessel and having thereon a coating of alumina.

References Cited in the file of this patent
UNITED STATES PATENTS

| | | |
|---|---|---|
| 360,993 | Brown | Apr. 12, 1887 |
| 1,728,168 | Pratt | Sept. 10, 1929 |
| 2,003,019 | Strobel | May 28, 1935 |
| 2,048,276 | Marlies et al. | July 21, 1936 |
| 2,475,360 | Spowers | July 5, 1949 |
| 2,687,230 | McPherson | Aug. 24, 1954 |
| 2,772,860 | Nelson | Dec. 4, 1956 |
| 2,818,995 | Duguid | Jan. 7, 1958 |
| 2,840,240 | Snyder | June 24, 1958 |
| 2,956,915 | Korn et al. | Oct. 18, 1960 |